(12) United States Patent
Yamamoto (10) Patent No.: US 7,918,259 B2
(45) Date of Patent: Apr. 5, 2011

(54) PNEUMATIC TIRE WITH TRIAXIAL FABRIC AND METHOD FOR PRODUCING THE SAME

(75) Inventor: Masahiko Yamamoto, Nerima-ku (JP)

(73) Assignee: Bridgestone Corporation, Tokyo (JP)

( * ) Notice: Subject to any disclaimer, the term of this patent is extended or adjusted under 35 U.S.C. 154(b) by 1040 days.

(21) Appl. No.: 11/663,883

(22) PCT Filed: Aug. 23, 2005

(86) PCT No.: PCT/JP2005/015253
§ 371 (c)(1), (2), (4) Date: Mar. 27, 2007

(87) PCT Pub. No.: WO2006/035560
PCT Pub. Date: Apr. 6, 2006

(65) Prior Publication Data
US 2009/0120551 A1    May 14, 2009

(30) Foreign Application Priority Data

Sep. 29, 2004  (JP) .................. 2004-284509
Dec. 15, 2004  (JP) .................. 2004-363079

(51) Int. Cl.
*B60C 9/00*      (2006.01)
*B60C 9/18*      (2006.01)
*B60C 13/00*     (2006.01)
*B60C 15/06*     (2006.01)
*B29D 30/38*     (2006.01)
*D03D 1/02*      (2006.01)
*D03D 1/00*      (2006.01)
*D03D 13/00*     (2006.01)

(52) U.S. Cl. .............. 152/533; 139/383 R; 152/526; 152/531; 152/543; 152/555; 152/563; 152/DIG. 14; 156/117; 442/204

(58) Field of Classification Search .......... 152/526, 152/543, 555, 563, DIG. 14, 531; 156/117; 139/419, 383 R, DIG. 1; 442/204
See application file for complete search history.

(56) References Cited

U.S. PATENT DOCUMENTS 458,142 A * 8/1891 Blundstone ............ 139/419 X
1,182,357 A * 5/1916 Dickinson .............. 152/563 X
(Continued)

FOREIGN PATENT DOCUMENTS

EP    0 506 490 A1 *  9/1992
(Continued)

OTHER PUBLICATIONS

English machine translation of Japanese Patent Application JP 7-156619 A already of record, Jun. 20, 1995.*

*Primary Examiner* — Adrienne C Johnstone
(74) *Attorney, Agent, or Firm* — Sughrue Mion, PLLC

(57) ABSTRACT

This invention provides a pneumatic tire having a highly improved steering stability, wherein a reinforcing layer formed by spirally winding a strip-shaped triaxial fabric or triaxial fabric-rubber composite having a width W satisfying a relation of the following formula (I):

$$W \geq 2/3 \times 3^{1/2} \times (2b/a+d) \qquad (I)$$

[wherein $d = 4 \times (D/(\pi\rho))^{1/2} \times 10^{-2}$, D is a thickness (total dtex) of cord constituting the triaxial fabric, $\rho$ is a density (g/cm$^3$) of the cord constituting the triaxial fabric, and a is weaving density (cords/b mm) in one axis constituting the three axes] in a circumferential direction of the tire is disposed in one or more of a bead portion 1, a sidewall portion 2 and a belt portion 5.

3 Claims, 9 Drawing Sheets

U.S. PATENT DOCUMENTS

| | | | | |
|---|---|---|---|---|
| 1,201,257 | A | * | 10/1916 | Cobb ........................ 152/563 X |
| RE28,155 | E | * | 9/1974 | Dow ........................ 139/383 R |
| 3,850,219 | A | * | 11/1974 | Snyder ........................ 152/531 |
| 3,991,803 | A | * | 11/1976 | Praszek ..................... 152/526 X |

FOREIGN PATENT DOCUMENTS

| | | |
|---|---|---|
| JP | 03220338 A * | 9/1991 |
| JP | 4-303002 A | 10/1992 |
| JP | 06064577 A * | 3/1994 |
| JP | 7-156619 A | 6/1995 |
| JP | 8-192605 A | 7/1996 |
| JP | 2001-121917 A | 5/2001 |
| JP | 2001-233025 A | 8/2001 |
| JP | 2001-287282 A | 10/2001 |
| JP | 2002-2218 A | 1/2002 |
| JP | 2002-59715 A | 2/2002 |
| JP | 2002-187408 A | 7/2002 |
| JP | 2004-203170 A | 7/2004 |

* cited by examiner

PNEUMATIC TIRE WITH TRIAXIAL FABRIC AND METHOD FOR PRODUCING THE SAME

TECHNICAL FIELD

This invention relates to a pneumatic tire and a method for producing the same, and more particularly to a pneumatic tire comprising a reinforcing layer composed of a triaxial fabric or a triaxial fabric-rubber composite at one or more of a bead portion, a sidewall portion and a belt portion and having an improved steering stability and a method for producing the same.

BACKGROUND ART

Recently, a force applied to each portion of the tire during the running becomes large with the speeding up of a vehicle, and hence it is demanded to prevent the deformation of the tire due to these forces to improve the steering stability. As to this demand, it is considered to thicken a gauge of each portion of the tire. In this case, however, the weight of the tire increases, and there is a problem that a low fuel consumption of the tire is deteriorated.

To the contrary, as a means for improving a stiffness of each portion of the tire without increasing the tire weight, there is known a technique wherein a reinforcing layer composed of each of various fabrics is disposed at a desired reinforcing site. Among these fabrics used in the reinforcing layer, a triaxial fabric is known to be excellent in the action of dispersing the applied force.

For example, there is known a pneumatic tire comprising a steel belt layer disposed at an outside of a carcass in a radial direction of the tire in which a triaxial fabric body is arranged at an outside of the steel belt layer in the radial direction of the tire as a band layer (belt reinforcing layer) by winding once or more in a circumferential direction of the tire. In the tire, a lifting phenomenon of steel cords in the steel belt layer during the high-speed running is suppressed to improve a uniformity of the tire (see JP-A-H04-303002).

Also, it is known that the triaxial fabric is used as a carcass and a bead reinforcing layer of the tire as well as a tensile belt of a rubber crawler to improve durabilities of the tire and the rubber crawler (see JP-A-H03-220338). Furthermore, it is known to improve the steering stability of the tire by disposing a bead reinforcing layer composed of the triaxial fabric in the bead portion (see JP-A-H07-156619). Moreover, it is known that the triaxial fabric is used as the belt of the tire to prevent a pantograph deformation of the belt and improve the durability of the tire (see JP-A-2002-2218).

DISCLOSURE OF THE INVENTION

In the tires provided with the reinforcing layer composed of the triaxial fabric, however, there is a stiffness change (step difference of stiffness) between a winding start end and a terminal end of the triaxial fabric, so that the stiffness of the reinforcing layer is non-uniform and there is a room for improving the uniformity of the tire. Moreover, as a result of the fact that the stiffness of the reinforcing layer is non-uniform and the uniformity is inferior, a localized stress concentration is caused and a theoretical stiffness inherent to the triaxial fabric cannot be developed sufficiently.

It is, therefore, an object of the invention to solve the above-mentioned problems of the conventional techniques in the tire comprising the reinforcing layer composed of the triaxial fabric and to provide a pneumatic tire in which the stiffness of the reinforcing layer is uniformized to improve the uniformity of the tire and the theoretical stiffness inherent to the triaxial fabric is sufficiently developed to largely improve the steering stability. Also, it is another object of the invention to provide a novel method for producing such a pneumatic tire.

The inventor has made various studies in order to achieve the above objects and discovered that the triaxial fabric or triaxial fabric-rubber composite is cut in the form of a strip having a specified width and such a strip is spirally wound in a desired reinforcing site of the tire at a necessary thickness over a necessary width in a circumferential direction of the tire to form the reinforcing layer, whereby the stiffness of the reinforcing layer is made uniform to improve the uniformity of the tire and hence the stress concentration is suppressed to highly improve the steering stability of the tire, and as a result, the invention has been accomplished.

That is, the pneumatic tire according to the invention is a pneumatic tire comprising a pair of bead portions, a pair of sidewall portions, a tread portion continuing to both of the sidewall portions, a carcass toroidally extending between the pair of bead portions and reinforcing these portions, and a belt portion disposed on a crown portion of the carcass outward in a radial direction of the tire and including at least two belt layers, characterized in that a reinforcing layer formed by spirally winding a strip-shaped triaxial fabric or triaxial fabric-rubber composite having a width W in a circumferential direction of the tire is disposed at one or more of the bead portion, the sidewall portion and the belt portion, and the width W (mm) of the strip-shaped triaxial fabric or triaxial fabric-rubber composite satisfies a relation of the following formula (I):

$$W \geq 2/3 \times 3^{1/2} \times (2b/a+d) \qquad (I)$$

[wherein $d=4\times(D/(\pi\rho))^{1/2}\times10^{-2}$, D is a thickness (total dtex) of cord constituting the triaxial fabric, $\rho$ is a density (g/cm³) of the cord constituting the triaxial fabric, and a is weaving density (cords/b mm) in one axis constituting the three axes].

In a preferable embodiment of the pneumatic tire according to the invention, the reinforcing layer is formed by spirally winding the strip-shaped triaxial fabric-rubber composite. The first method for producing a pneumatic tire according to the invention is a method for producing such a pneumatic tire, and more particularly a method for producing a pneumatic tire provided with the reinforcing layer composed of the triaxial fabric-rubber composite at one or more of the bead portion, the sidewall portion and the belt portion, characterized in that the reinforcing layer is formed by spirally winding the strip-shaped triaxial fabric-rubber composite having a width W satisfying the relation of the formula (I) in a circumferential direction of the tire.

In another preferable embodiment of the pneumatic tire according to the invention, the reinforcing layer is formed by spirally winding the strip-shaped triaxial fabric or triaxial fabric-rubber composite plural times in the same plane. The second method for producing a pneumatic tire according to the invention is a method for producing such a pneumatic tire, and more particularly a method for producing a pneumatic tire provided with the reinforcing layer composed of the triaxial fabric or triaxial fabric-rubber composite at one or more of the bead portion, the sidewall portion and the belt portion, characterized in that the reinforcing layer is formed by spirally winding the strip-shaped triaxial fabric or triaxial fabric-rubber composite having a width W satisfying the relation of the formula (I) plural times in the same plane in a circumferential direction of the tire.

According to the invention, in the pneumatic tire provided with the reinforcing layer composed of the triaxial fabric or triaxial fabric-rubber composite at one or more of the bead portion, the sidewall portion and the belt portion, such a reinforcing layer is formed by spirally winding the strip-shaped triaxial fabric or triaxial fabric-rubber composite with a width satisfying the specified relation in the circumferential direction of the tire, whereby there can be provided a pneumatic tire in which the stiffness of the reinforcing layer is uniform, the uniformity of the tire is high and the local stress concentration is suppressed to highly improve the steering stability. Also, there can be provided a novel method for producing such a pneumatic tire.

BRIEF DESCRIPTION OF THE DRAWINGS

FIG. 8(a) is a side view of an embodiment of the pneumatic tire according to the invention and (b) is a perspective view of another embodiment of the pneumatic tire according to the invention.

BEST MODE FOR CARRYING OUT THE INVENTION

Figure 1:
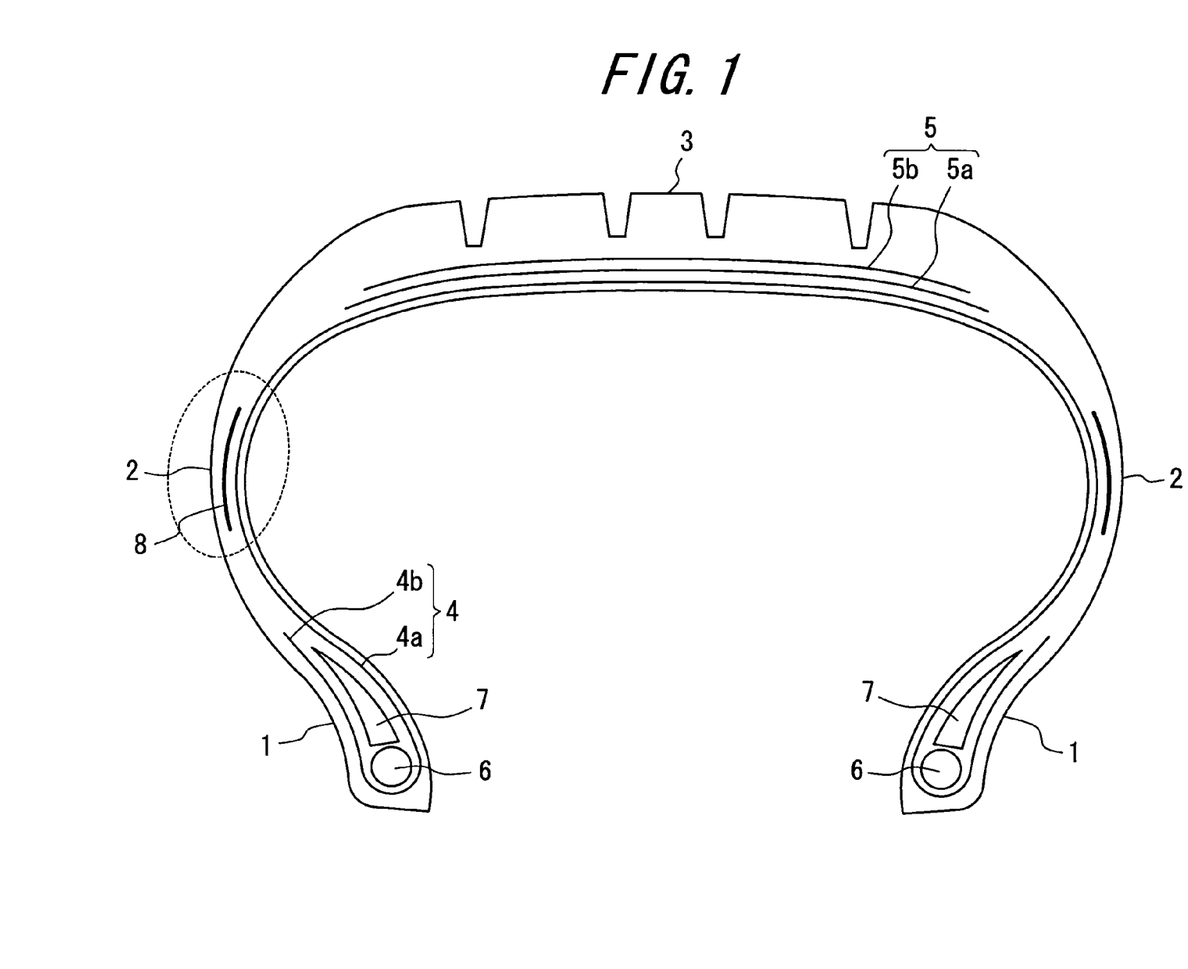
FIG. 1 is a sectional view of an embodiment of the pneumatic tire according to the invention.
Figure 2:
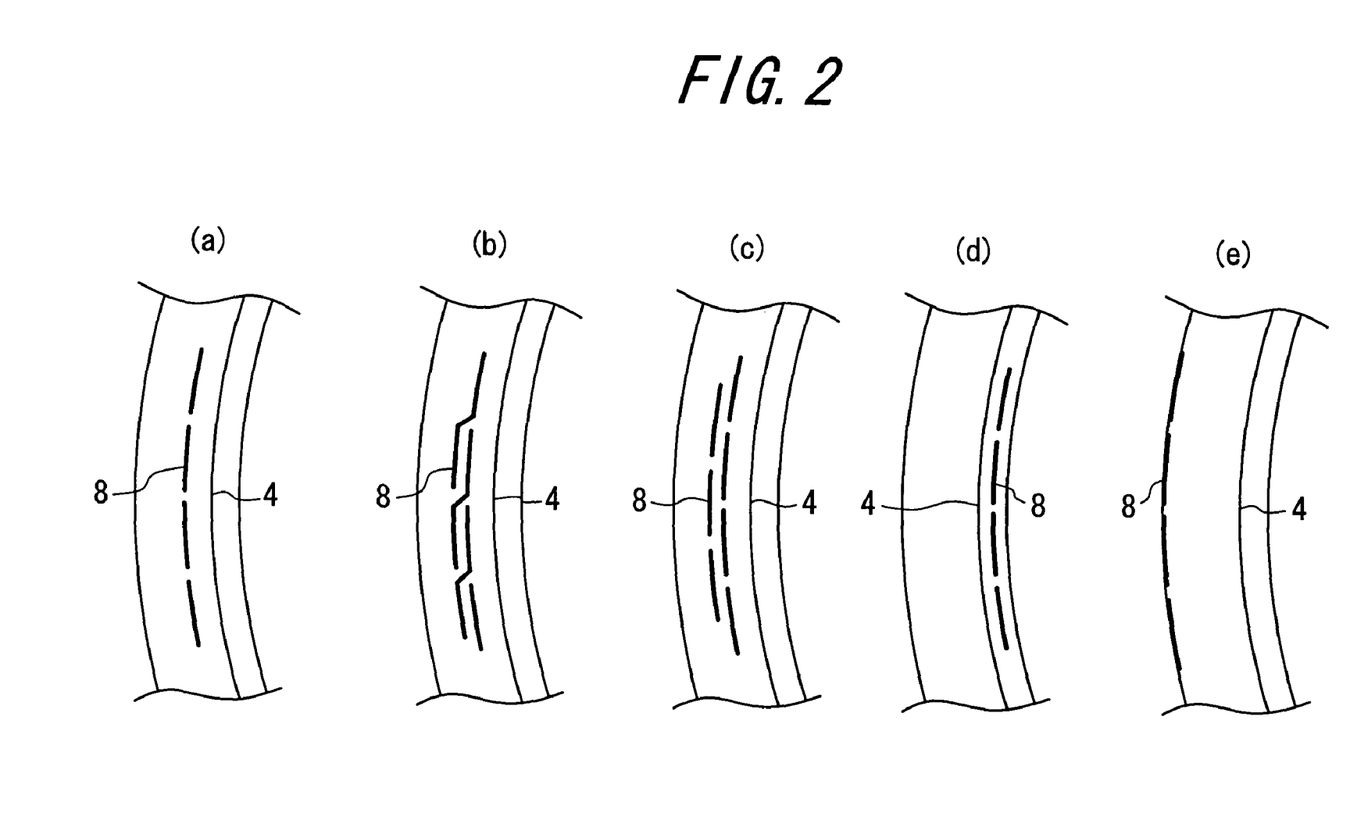
FIG. 2 is a partial sectional view of a modified form of a sidewall portion in the pneumatic tire according to the invention.

The pneumatic tire according to the invention will be described in detail below with reference to the attached drawings. FIG. 1 is a sectional view of an embodiment of the pneumatic tire according to the invention and FIG. 2 is a partial sectional view of a modified form of a sidewall portion (a dotted line portion in FIG. 1) in such a pneumatic tire according to the invention. The tire shown in FIG. 1 comprises a pair of right and left bead portions 1, a pair of sidewall portions 2, a tread portion 3 continuing to both of the sidewall portions 2, a radial carcass 4 toroidally extending between the pair of bead portions 1 and reinforcing these portions 1, 2, 3, a belt portion 5 disposed on an outside of the carcass 4 in a radial direction of the tire and including two belt layers 5a, 5b, a bead filler 7 disposed on an outside of a ring-shaped bead core 6 embedded in the respective bead portion 1 in the radial direction of the tire, and a side reinforcing layer 8 disposed in the respective sidewall portion 2. The illustrated radial carcass 4 consists of a main body portion 4a toroidally extending between the pair of the bead cores 6 and a turnup portion 4b wound around each bead core 6 from an inside to an outside in a widthwise direction of the tire, but the structure and the ply number of the radial carcass 4 are not limited thereto. Also, the illustrated belt portion 5 is comprised of a belt layer 5a located inside in the radial direction of the tire and a belt layer 5b located outside in the radial direction of the tire, but the number of belt layers may be three or more. Furthermore, the bead filler 7 is located between the main body portion 4a and the turnup portion 4b of the carcass in the illustrated embodiment, but the pneumatic tire according to the invention may not comprise the bead filler 7. At this moment, the side reinforcing layer 8 is formed by spirally winding a strip-shaped triaxial fabric or triaxial fabric-rubber composite having a width W in the circumferential direction of the tire.

As the structure of the side reinforcing layer 8 may be a structure wherein strips each composed of the triaxial fabric or triaxial fabric-rubber composite are arranged in parallel with each other in a widthwise direction of the strip without being overlapped as shown in FIGS. 2(a), (d) and (e), a structure wherein the strips are arranged so as to partially overlap with each other as shown in FIG. 2(b), or a structure wherein plural layers each formed by arranging the strips in parallel in the widthwise direction of the strip are arranged so as to overlap with each other as shown in FIG. 2(c). Moreover, the side reinforcing layer 8 may be disposed outside the carcass 4 in the sidewall portion 2 in the widthwise direction of the tire as shown in FIGS. 1 and 2(a), (b) and (c), or may be disposed inside the carcass 4 in the sidewall portion 2 in the widthwise direction of the tire as shown in FIG. 2(d), or may be disposed near to an outer surface of the sidewall portion 2 (outermost side in the widthwise direction of the tire) as shown in FIG. 2(e).

Figure 3:
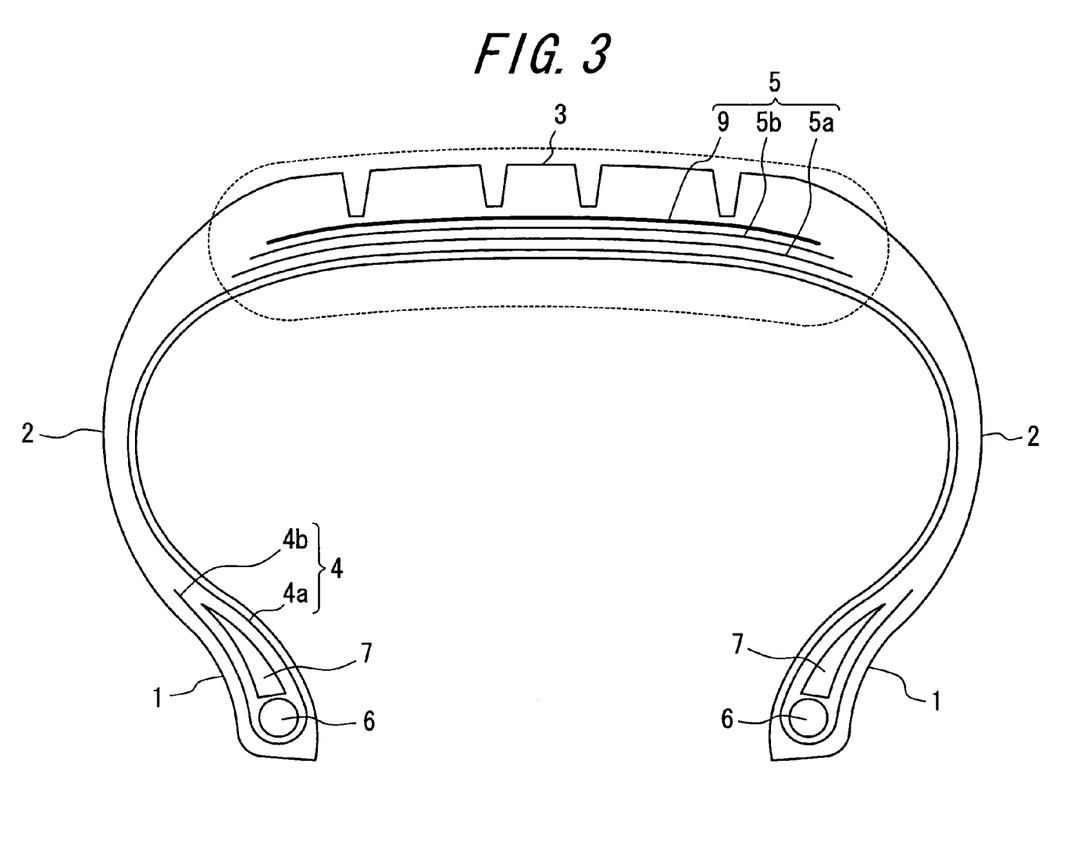
FIG. 3 is a sectional view of another embodiment of the pneumatic tire according to the invention.
Figure 4:
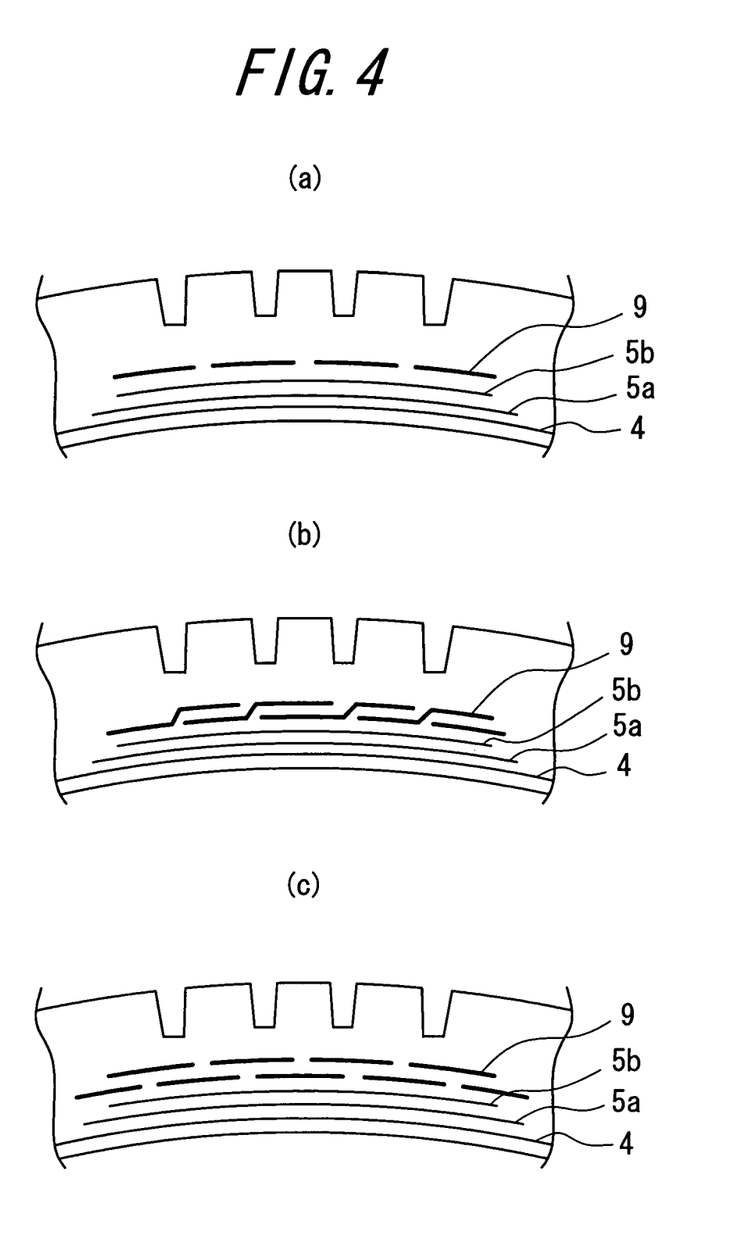
FIG. 4 is a partial sectional view showing a modified form of a belt portion in the pneumatic tire according to the invention.
Figure 5:
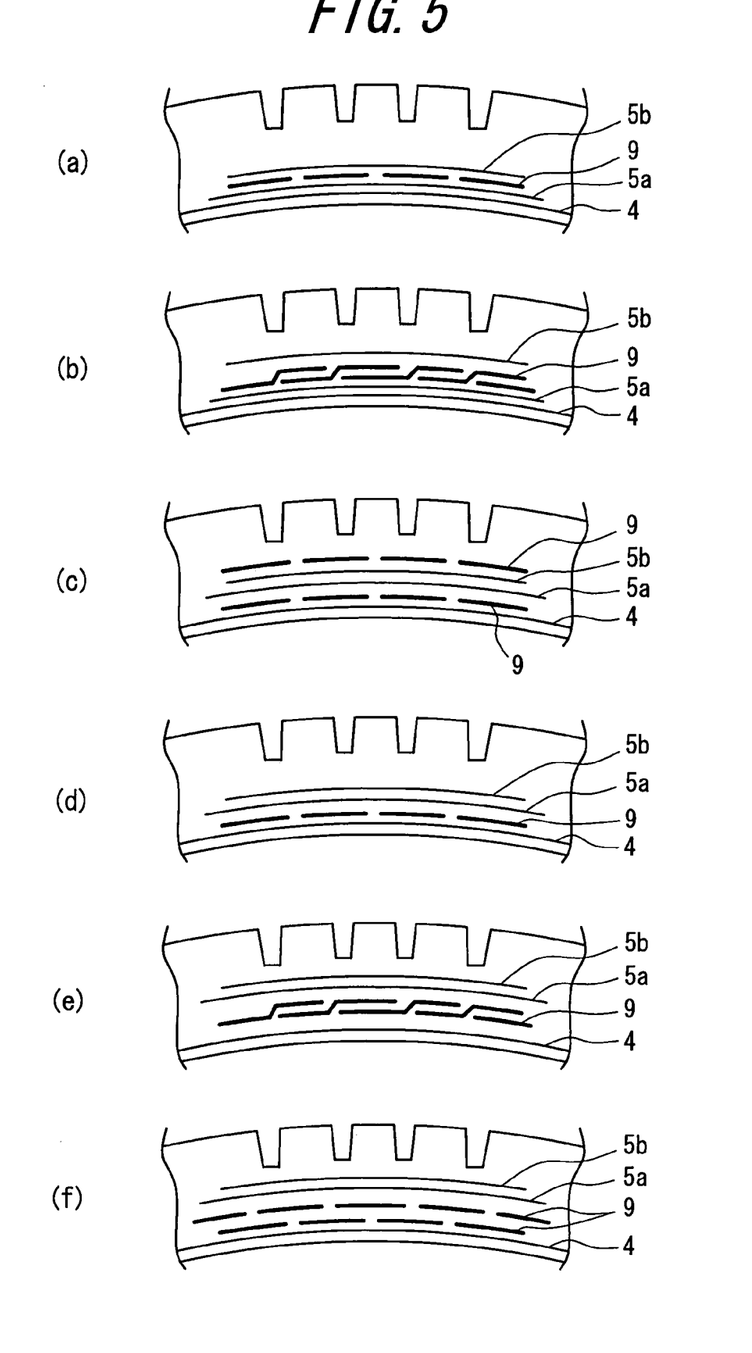
FIG. 5 is a partial sectional view showing another modified form of the belt portion in the pneumatic tire according to the invention.

FIG. 3 is a sectional view of another embodiment of the pneumatic tire according to the invention, and FIGS. 4 and 5 are partial sectional views (corresponding to a dotted line portion in FIG. 3) showing modified forms of the belt portion in such a pneumatic tire according to the invention, respectively. The tire shown in FIG. 3 has the same structure as the tire shown in FIG. 1 except that a belt reinforcing layer 9 is disposed in the belt portion 5 instead of the side reinforcing layers 8. The belt reinforcing layer 9 is formed by spirally winding the strip-shaped triaxial fabric or triaxial fabric-rubber composite having a width W in the circumferential direction of the tire.

As the structure of the belt reinforcing layer 9 may be a structure wherein the strips are arranged in parallel with each other in the widthwise direction of the strip without being overlapped as shown in FIG. 4(a) and FIGS. 5(a) and (d), a structure wherein the strips are arranged so as to partially overlap with each other as shown in FIG. 4(b) and FIGS. 5(b) and (e), or a structure wherein plural layers each formed by arranging the strips in parallel in the widthwise direction of the strip are arranged so as to overlap with each other as shown in FIG. 4(c) and FIGS. 5(c) and (f). Moreover, the belt reinforcing layer 9 may be disposed outside the belt layer 5b in the belt portion 5 in the radial direction of the tire (i.e., further outside of the outermost belt layer in the radial direction of the tire) as shown in FIG. 3 and FIGS. 4(a), (b) and (c), or may be disposed between the belt layer 5a and the belt layer 5b in the belt portion 5 (i.e., interbedded between the belt layers) as shown in FIGS. 5(a) and (b), or may be disposed so as to sandwich the belt layers 5a, 5b in the belt portion 5 as shown in FIG. 5(c), or may be disposed inside the belt layer 5a in the belt portion 5 in the radial direction of the tire (i.e., between the belt layer and the carcass) as shown in FIGS. 5(d), (e) and (f).

Figure 6:
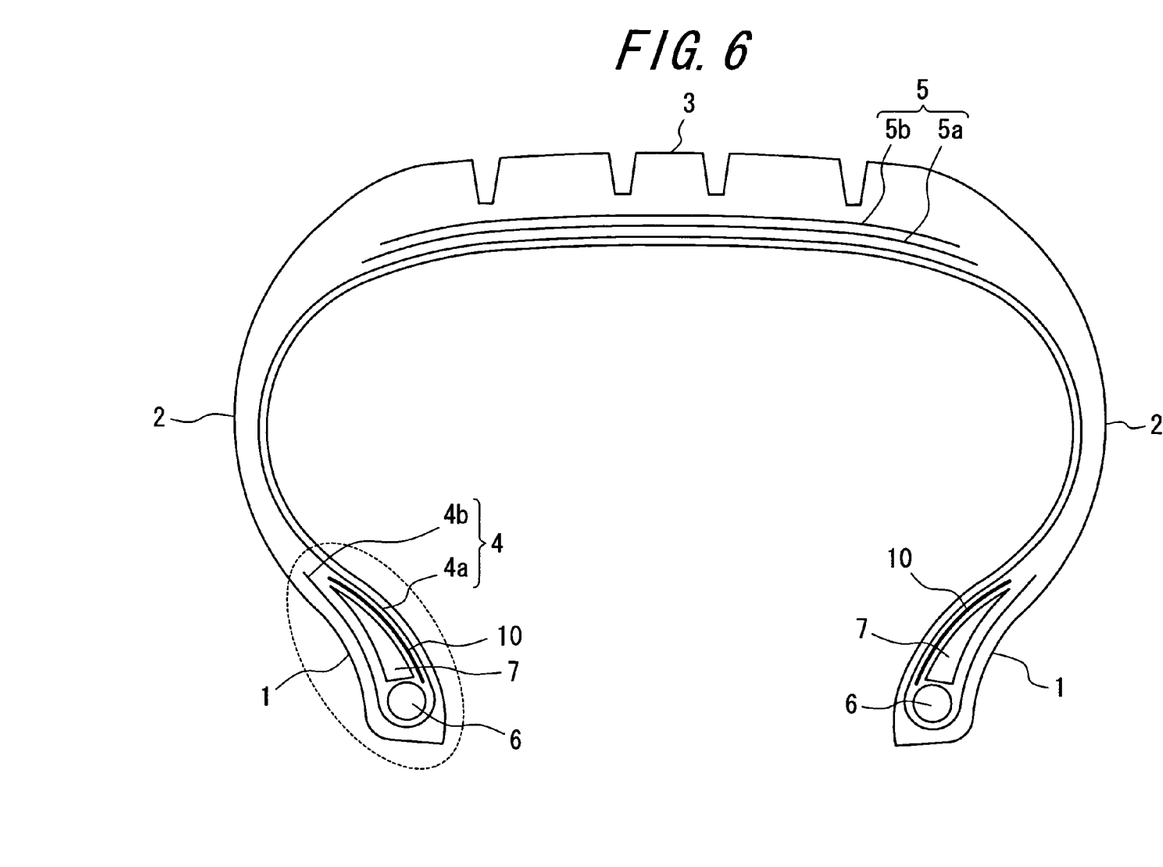
FIG. 6 is a sectional view of a further embodiment of the pneumatic tire according to the invention.
Figure 7:
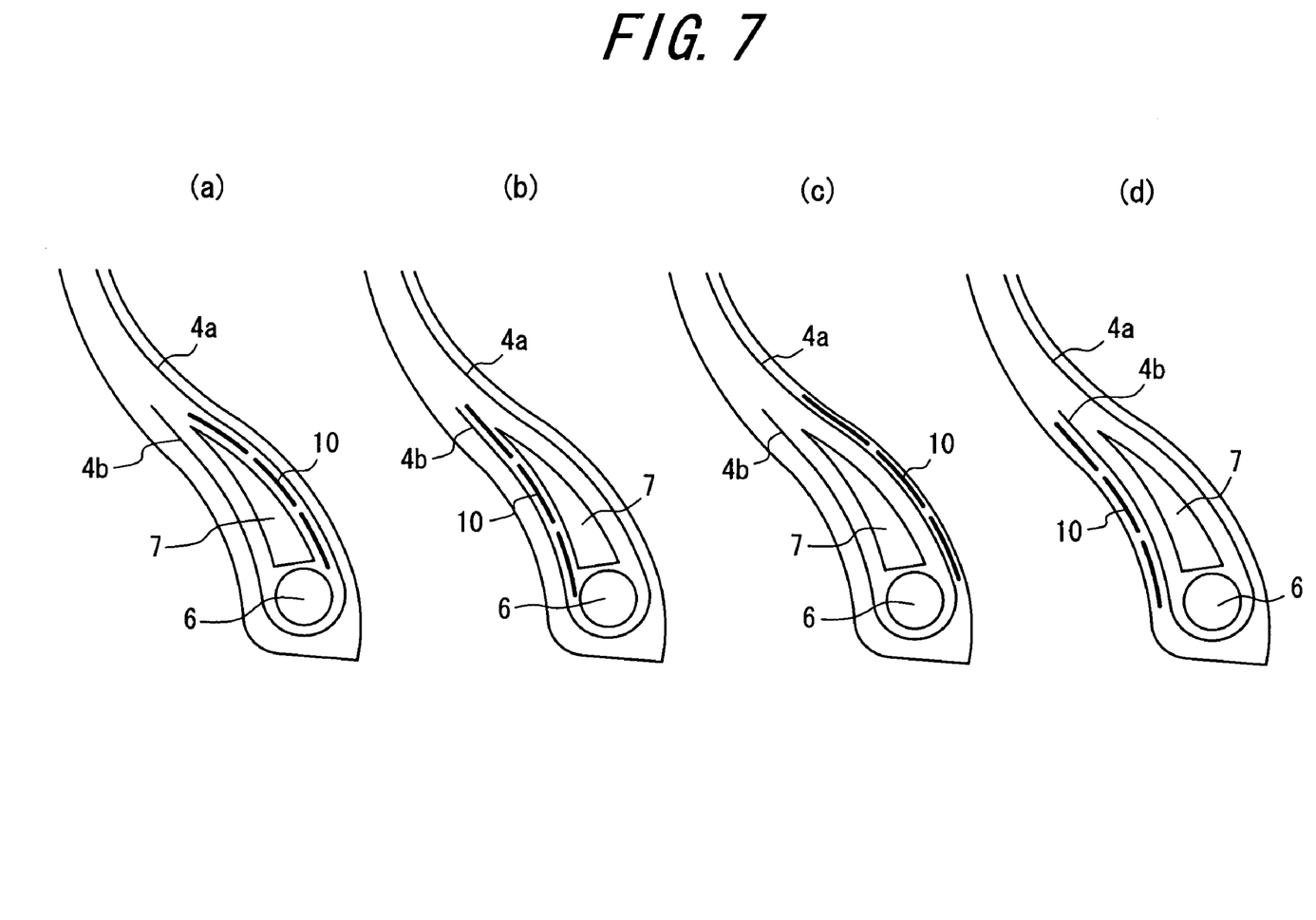
FIG. 7 is a partial sectional view of a modified form of a bead portion in the pneumatic tire according to the invention.

Furthermore, FIG. 6 is a sectional view of a further embodiment of the pneumatic tire according to the invention, and FIG. 7 is a partial sectional view of a modified form of a bead portion (a dotted line portion in FIG. 6) in such a pneumatic tire according to the invention. The tire shown in FIG. 6 has the same structure as the tire shown in FIG. 1 except that a bead reinforcing layers 10 is arranged in the bead portion 1 instead of the side reinforcing layers 8. The bead reinforcing layer 10 is formed by spirally winding the strip-shaped triaxial fabric or triaxial fabric-rubber composite having a width W in the circumferential direction of the tire.

As the structure of the bead reinforcing layer 10 is preferable a structure wherein the strips are arranged in parallel with each other in the widthwise direction of the strip without being overlapped as shown in FIGS. 7(a), (b), (c) and (d), but may be a structure wherein the strips are arranged so as to partially overlap with each other or a structure wherein plural layers each formed by arranging the strips in parallel in the widthwise direction of the strip are arranged so as to overlap with each other. Moreover, the bead reinforcing layers 10 may be disposed between the main body portion 4a of the carcass and the bead filler 7 as shown in FIG. 7(a), or may be disposed between the turnup portion 4b of the carcass and the bead filler 7 as shown in FIG. 7(b), or may be disposed inside the main body portion 4a of the carcass in the widthwise direction of the tire as shown in FIG. 7(c), or may be disposed outside the turnup portion 4b of the carcass in the widthwise direction of the tire as shown in FIG. 7(d).

Figure 8:
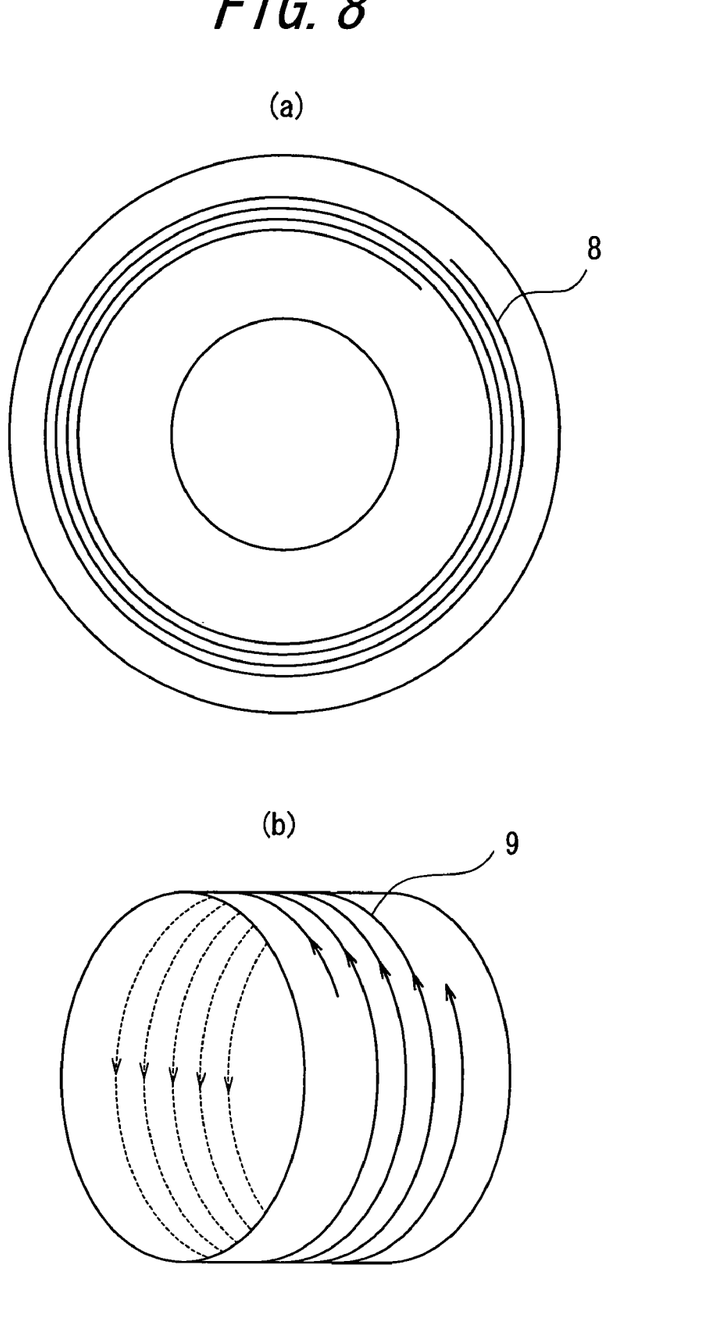

The side reinforcing layer 8 is formed by spirally winding the strip-shaped triaxial fabric or triaxial fabric-rubber composite having a width W in the circumferential direction of the tire at the sidewall portion 2, and more particularly formed by spirally and continuously winding the strip over a desired reinforcing width as shown in FIG. 8(a). The side reinforcing layer 8 is formed by spirally winding one strip in FIG. 8(a), but may be formed by spirally and continuously winding plural strips. Also, the bead reinforcing layer 10 is formed by spirally winding the strip-shaped triaxial fabric or triaxial fabric-rubber composite having a width W in the circumferential direction of the tire at the desired position of the bead portion 1 likewise the side reinforcing layer 8.

The belt reinforcing layer 9 is formed by spirally winding the strip-shaped triaxial fabric or triaxial fabric-rubber composite having a width W in the circumferential direction of the tire at the belt portion 5, and more particularly formed by spirally and continuously winding the strip over a desired reinforcing width as shown in FIG. 8(b). Moreover, the belt reinforcing layer 9 is formed by spirally winding one strip in FIG. 8(b), but may be formed by spirally and continuously winding plural strips.

As mentioned above, in the pneumatic tire according to the invention, the reinforcing layer composed of the strip-shaped triaxial fabric or triaxial fabric-rubber composite is necessary to be disposed in at least one of the sidewall portion 2, the belt portion 5 and the bead portion 1, and may be disposed in two or more thereof. Moreover, in the pneumatic tire of the invention, the triaxial fabric itself may be shaped into a strip and spirally wound, or the triaxial fabric may be previously compounded with a rubber to form a triaxial fabric-rubber composite and then the composite may be shaped into a strip and spirally wound. When a green tire is formed by using the triaxial fabric itself and the green tire is vulcanized to produce a tire, rubber penetrates into the triaxial fabric from the rubber member adjacent to the triaxial fabric, so that there can be produced the same tire as in the case that the triaxial fabric-rubber composite is previously produced and a green tire is formed by using the composite and vulcanized. Moreover, in the pneumatic tire according to the invention, the reinforcing layer may be formed by shaping the triaxial fabric or triaxial fabric-rubber composite into a strip and spirally winding in the same plane plural times.

Figure 9:
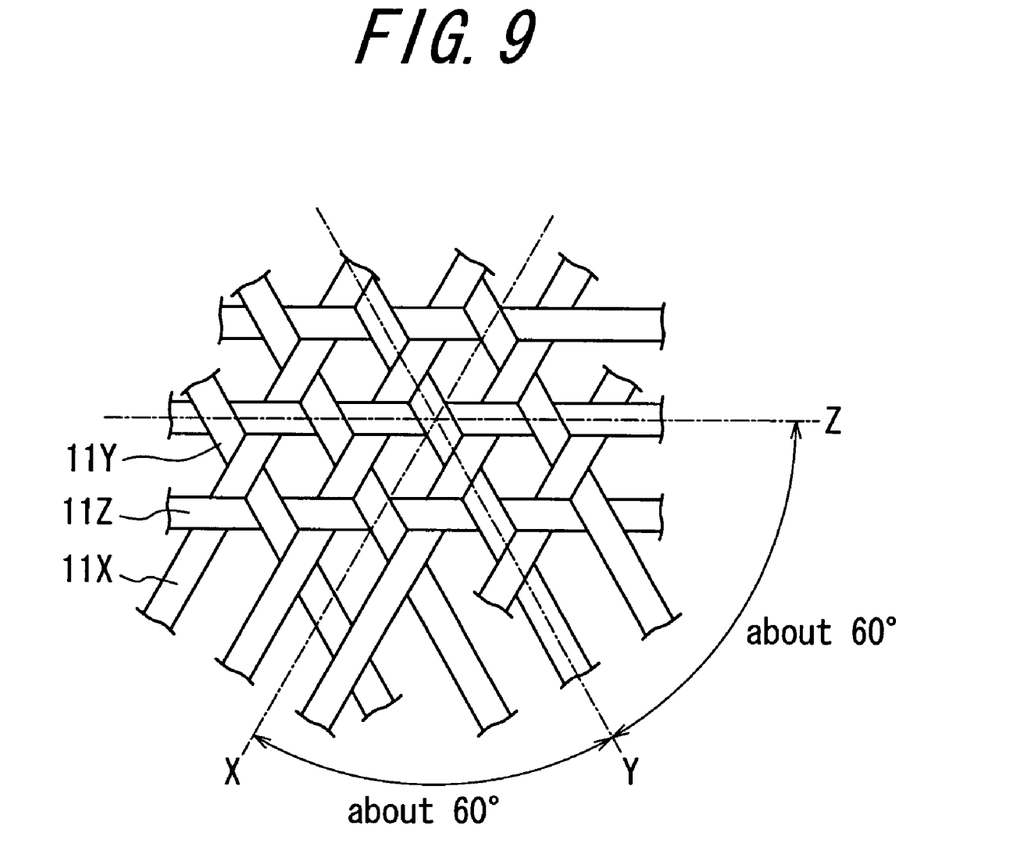
FIG. 9 is a plan view of a triaxial fabric.

The triaxial fabric used in the pneumatic tire according to the invention is a 2D-triaxial fabric in which two kinds of warps (X axial yarn 11X and Y axial yarn 11Y) and a weft (Z axial yarn 11Z) are woven at a state of crossing them at an angle of about 60°. The triaxial fabric has sufficient strength and stiffness multidirectionally.

As the fiber constituting the triaxial fabric are mentioned organic fibers, for example, a polyester fiber such as polyethylene terephthalate (PET) fiber or polyethylene naphthalate (PEN) fiber, an aromatic polyamide (aramid) fiber, an aliphatic polyamide (nylon) fiber, a polyparaphenylene benzoxazole (PBO) fiber, a rayon, a polyketone (PK) fiber and so on as well as steel. Among them, the aromatic polyamide fiber is preferable. These fibers may be used alone or in a combination of two or more. A configuration of the triaxial fabric is not particularly limited and can be properly selected in accordance with the use purpose and may be Basic Weave, Bi-Plain Weave or Basic Basket Weave.

The triaxial fabric-rubber composite used in the pneumatic tire according to the invention is formed by rubberizing the triaxial fabric with a coating rubber. The coating rubber is not particularly limited and formed, for example, by compounding additives usually used in the rubber industry such as carbon black, a softener, zinc white, an antioxidant, a vulcanization accelerator and sulfur and the like into a usual rubber component such as natural rubber (NR), polybutadiene rubber (BR), styrene-butadiene copolymer rubber (SBR), polyisoperne rubber (IR) and the like.

In the pneumatic tire according to the invention, the reinforcing layer formed by cutting the triaxial fabric or triaxial fabric-rubber composite at a width W to form the strip and spirally winding the strip in the circumferential direction of the tire is disposed in one or more of the bead portion 1, the sidewall portion 2 and the belt portion 5. The width W (mm) of the strip satisfies a relation of the following formula (I):

$$W \geq 2/3 \times 3^{1/2} \times (2b/a+d) \qquad (I)$$

[wherein $d=4\times(D/(\pi\rho))^{1/2}\times10^{-2}$, D is a thickness (total dtex) of cord constituting the triaxial fabric, $\rho$ is a density (g/cm$^3$) of the cord constituting the triaxial fabric, and a is weaving density (cords/b mm) in one axis constituting the three axes] as an absolute value. When the width W of the strip is less than the right side of the formula (I), the strip width is too narrow and the reinforcing effect by the triaxial fabric or triaxial fabric-rubber composite cannot be developed sufficiently. On the other hand, the upper limit of the width W of the strip is not particularly limited as far as it is not contradictory, but the width W is preferably not more than A mm [wherein $A=20/3\times3^{1/2}\times(2b/a+d)$], and more preferably not more than B mm [wherein $B=3\times3^{1/2}\times(2b/a+d)$]. When the width W of the strip is not more than A mm, the stiffness of the reinforcing layer can be uniformized to prevent the stress concentration while surely developing the reinforcing effect by the triaxial fabric or triaxial fabric-rubber composite.

In the pneumatic tire according to the invention, the triaxial fabric or triaxial fabric-rubber composite is shaped into the strip of the width satisfying the formula (I) and such a strip is spirally wound in the circumferential direction of the tire to form at least one of the side reinforcing layer 8, the belt reinforcing layer 9 and the bead reinforcing layer 10, whereby the stiffness of the reinforcing layer can be uniformized to effectively reduce a possibility of lowering the durability of the reinforcing layer due to the stress concentration. Also, the utilization factor is improved by reducing the stress concentration of the reinforcing layer, and as a result an improvement of the steering stability and a weight reduction of the tire can be accomplished. The utilization factor used herein means a value calculated by dividing the stiffness of the cut-out member from the tire by a theoretical stiffness. Furthermore, the step difference of stiffness (stiffness change) between a winding start end and a terminal end of the strip can be reduced by shaping the triaxial fabric or triaxial fabric-rubber composite into the strip of the width satisfying the formula (I) and spirally winding the strip to form the reinforcing layer, and as a result the uniformity of the tire is improved.

The pneumatic tire according to the invention is produced by disposing the reinforcing layer formed by spirally winding the above triaxial fabric or triaxial fabric-rubber composite in one or more of the sidewall portion 2, the belt portion 5 and the bead portion 1 at a building step of a green tire, forming and then vulcanizing the green tire. In this case, the tire comprising the reinforcing layer formed by using the triaxial fabric-rubber composite can be produced according to the first production method of the invention, and this production method is characterized by comprising the step of forming the reinforcing layer by spirally winding the strip-shaped triaxial fabric-rubber composite of the width W satisfying the relation of the formula (I) in the circumferential direction of the tire. Also, the tire comprising the reinforcing layer formed by spirally winding the strip in the same plane plural times can be produced according to the second production method of the invention, and this production method is characterized by comprising the step of forming the reinforcing layer by spirally winding the strip-shaped triaxial fabric or triaxial fabric-rubber composite of the width W satisfying the relation of the formula (I) in the same plane plural times in the circumferential direction of the tire. Moreover, as a gas filled into the tire of the invention can be used usual air or air having a regulated partial oxygen pressure but also inert gases such as nitrogen, argon, helium and so on.

EXAMPLES

The following examples are given in illustration of the invention and are not intended as limitations thereof.

There is prepared a tire having a tire size of 205/65R15 and a structure shown in FIG. 2(*a*) wherein a triaxial fabric shown in Table 1 is disposed in a sidewall portion, and the steering stability is evaluated by the following method. In Comparative Example 1 and Examples 1-3, since the triaxial fabric formed by weaving aramid cords having a thickness D=1800 dtex and a density $\rho=1.44$ g/cm$^3$ at a weaving density a=18.5 (cords/50 mm) is used, the right side of the formula (I) is about 7.17. The results are shown in Table 1.

<Steering Stability>

The steering stability is a feeling evaluation (particularly evaluations of a handle response and a stability during cornering) by a test driver when the tire to be tested is mounted onto a vehicle and actually run on a test course, and is shown by an index on the basis that the steering stability of the tire in Reference Example 1 is 100. The larger the index value, the better the steering stability.

TABLE 1

|  | Reference Example 1 | Comparative Example 1 | Example 1 | Example 2 | Example 3 |
|---|---|---|---|---|---|
| Material of cord constituting triaxial fabric | None | Aramid | Aramid | Aramid | Aramid |
| Thickness D of cord constituting triaxial fabric (dtex) | — | 1800 | 1800 | 1800 | 1800 |
| Density $\rho$ of cord constituting triaxial fabric (g/cm$^3$) | — | 1.44 | 1.44 | 1.44 | 1.44 |
| Weaving density a of triaxial fabric (cords/50 mm) | — | 18.5 | 18.5 | 18.5 | 18.5 |
| Width W of strip (mm) | — | 5.0 | 10.0 | 20.0 | 20.0 |
| Reinforcing width (mm) | — | 40 | 40 | 40 | 60 |
| Steering stability (index) | 100 | 102 | 118 | 120 | 128 |

As seen from Table 1, the degree of improving the steering stability is considerably large in the tires of Examples 1-3 wherein the width of the triaxial fabric strip exceeds 7.17 mm. On the other hand, in the tire of Comparative Example 1 wherein the triaxial fabric is disposed in the sidewall portion but the width of the triaxial fabric strip is excessively narrow, the steering stability is not substantially improved as compared with Reference Example 1.

Then, there is prepared a tire having a tire size of 205/65R15 and a structure shown in FIG. 4(*a*) in which a triaxial fabric shown in Table 2 is disposed in a belt portion, and the steering stability is evaluated according to the aforementioned method (however shown by an index on the basis that the steering stability of the tire in Reference Example 2 is 100). In Comparative Example 2 and Examples 4-6, since the triaxial fabric formed by weaving aramid cords having a thickness D=2500 dtex and a density $\rho=1.44$ g/cm$^3$ at a weaving density a=18.5 (cords/50 mm) is used, the right side of the formula (I) is about 7.32. The results are shown in Table 2.

TABLE 2

|  | Reference Example 2 | Comparative Example 2 | Example 4 | Example 5 | Example 6 |
|---|---|---|---|---|---|
| Material of cord constituting triaxial fabric | None | Aramid | Aramid | Aramid | Aramid |
| Thickness D of cord constituting triaxial fabric (dtex) | — | 2500 | 2500 | 2500 | 2500 |
| Density $\rho$ of cord constituting triaxial fabric (g/cm$^3$) | — | 1.44 | 1.44 | 1.44 | 1.44 |

TABLE 2-continued

|  | Reference Example 2 | Comparative Example 2 | Example 4 | Example 5 | Example 6 |
|---|---|---|---|---|---|
| Weaving density a of triaxial fabric (cords/50 mm) | — | 18.5 | 18.5 | 18.5 | 18.5 |
| Width W of strip (mm) | — | 5.0 | 10.0 | 20.0 | 20.0 |
| Reinforcing width (mm) | — | 60 | 60 | 60 | 120 |
| Steering stability (index) | 100 | 103 | 122 | 124 | 133 |

As seen from Table 2, the degree of improving the steering stability is very large in the tires of Examples 4-6 wherein the width of the triaxial fabric strip exceeds 7.32 mm. On the other hand, in the tire of Comparative Example 2 wherein the triaxial fabric is disposed in the belt portion but the width of the triaxial fabric strip is excessively narrow, the steering stability is not substantially improved as compared with Referential Example 2.

The invention claimed is:

1. A pneumatic tire comprising:
a pair of bead portions;
a pair of sidewall portions;
a tread portion continuing to both of the sidewall portions;
a carcass toroidally extending between the pair of bead portions and reinforcing the bead portions;
a belt portion disposed on a crown portion of the carcass outward in a radial direction of the tire and including at least two belt layers; and
a reinforcing layer formed by spirally winding a strip-shaped triaxial fabric or triaxial fabric-rubber composite having a width W in a circumferential direction of the tire a plurality of times, the reinforcing layer disposed at one or more of the bead portion, the sidewall portion and the belt portion, and the width W in mm of the strip-shaped triaxial fabric or triaxial fabric-rubber composite satisfies a relation of the following formula (I):

$$W \geq 2/3 \times 3^{1/2} \times (2b/a+d) \tag{I}$$

wherein $d=4\times(D/(\pi p))^{1/2}\times 10^{-2}$, D is a thickness in total dtex of cord constituting the triaxial fabric, p is a density in g/cm$^3$ of the cord constituting the triaxial fabric, and a is weaving density in cords/b mm in one axis constituting the three axes, and
wherein the reinforcing layer is formed by spirally winding the strip-shaped triaxial fabric or triaxial fabric-rubber composite in the same plane the plurality of times.

2. A pneumatic tire comprising:
a pair of bead portions;
a pair of sidewall portions;
a tread portion continuing to both of the sidewall portions;
a carcass toroidally extending between the pair of bead portions and reinforcing the bead portions;
a belt portion disposed on a crown portion of the carcass outward in a radial direction of the tire and including at least two belt layers; and
a reinforcing layer formed by spirally winding a strip-shaped triaxial fabric or triaxial fabric-rubber composite having a width W in a circumferential direction of the tire a plurality of times, the reinforcing layer disposed at one or more of the bead portion, the sidewall portion and the belt portion, and the width W in mm of the strip-shaped triaxial fabric or triaxial fabric-rubber composite satisfies a relation of the following formula (I):

$$W \geq 2/3 \times 3^{1/2} \times (2b/a+d) \tag{I}$$

wherein $d=4\times(D/(\pi p))^{1/2}\times 10^{-2}$, D is a thickness in total dtex of cord constituting the triaxial fabric, p is a density in g/cm$^3$ of the cord constituting the triaxial fabric, and a is weaving density in cords/b mm in one axis constituting the three axes, and
wherein the width W is not more than $3 \times 3^{1/2} \times (2b/a+d)$.

3. A method for producing a pneumatic tire comprising a pair of bead portions, a pair of sidewall portions, a tread portion continuing to both of the sidewall portions, a carcass toroidally extending between the pair of bead portions and reinforcing these portions, and a belt portion disposed on a crown portion of the carcass outward in a radial direction of the tire and including at least two belt layers and provided with a reinforcing layer composed of a triaxial fabric-rubber composite disposed in one or more of the bead portion, the sidewall portion and the belt portion,
the method comprising:
forming the reinforcing layer by spirally winding a strip-shaped triaxial fabric or triaxial fabric-rubber composite of a width W satisfying the relation of a formula (I) in the same plane plural times in a circumferential direction of the tire,
wherein the formula (I) is $W \geq 2/3 \times 3^{1/2} \times (2b/a+d)$,
wherein $d=4\times(D/(\pi p))^{1/2}\times 10^{-2}$, D is a thickness in total dtex of cord constituting the triaxial fabric, p is a density in g/cm$^3$ of the cord constituting the triaxial fabric, and a is weaving density in cords/b mm in one axis constituting the three axes; and
then providing the reinforcing layer in one or more of the bead portions, the sidewall portions, and the belt portion of the pneumatic tire.

* * * * *